United States Patent [19]
Calvert

[11] 4,169,714
[45] Oct. 2, 1979

[54] REMOVAL OF FINE PARTICLES FROM A GAS STREAM BY SOLID PARTICLE ADDITION IN VENTURI CONTACTOR

[75] Inventor: Seymour Calvert, San Diego, Calif.

[73] Assignee: A.P.T., Inc., San Diego, Calif.

[21] Appl. No.: 759,408

[22] Filed: Jan. 14, 1977

[51] Int. Cl.² .............................................. B03C 3/00
[52] U.S. Cl. .............................................. 55/5; 55/6; 55/262; 55/107; 55/337; 55/459 R; 209/5; 209/139 R
[58] Field of Search ....................... 55/1, 5, 6, 77–79, 55/97–99, 262, 107, 390, 479, 459 R, 337; 209/5, 139 R

[56] References Cited

U.S. PATENT DOCUMENTS

| | | |
|---|---|---|
| 1,446,778 | 2/1923 | Witte .............................. 55/5 |
| 2,231,424 | 2/1941 | Huppke .......................... 55/77 |
| 2,377,512 | 6/1945 | Page, Jr. ......................... 55/79 |
| 2,695,265 | 11/1954 | Degnen ........................... 208/47 |
| 2,924,294 | 2/1960 | Johnstone ....................... 55/107 |
| 3,091,069 | 5/1963 | Brasefield ....................... 55/5 |
| 3,473,300 | 10/1969 | Wilm et al. ..................... 55/96 |
| 3,809,438 | 5/1974 | Hubbard ......................... 55/340 |
| 3,883,324 | 5/1975 | Balla et al. ...................... 55/1 |
| 3,921,544 | 11/1975 | Reese .............................. 55/345 |
| 4,061,476 | 12/1977 | Holter et al. .................... 55/73 |

FOREIGN PATENT DOCUMENTS

| | | |
|---|---|---|
| 2153777 | 5/1973 | Fed. Rep. of Germany ............. 55/262 |
| 559532 | 2/1944 | United Kingdom ........................ 55/5 |

*Primary Examiner*—Bernard Nozick
*Attorney, Agent, or Firm*—Spensley, Horn & Lubitz

[57] ABSTRACT

Fine particles contaminating a gas stream are removed from the gas stream by moving the gas stream at a velocity of between 50 and 500 feet per second; dispersing relatively larger solid collector particles in the gas stream to cause the collector particles to capture the fine particles by interception and inertial impaction and thereby form agglomerates consisting of the collector particles having the fine particles adhered thereto; and removing the agglomerates from the gas stream. Following removal from the gas stream the agglomerates may be cleaned to separate the fine particle material from the collector particles so that the collector particles can be redispersed into the gas stream.

21 Claims, 8 Drawing Figures

REMOVAL OF FINE PARTICLES FROM A GAS STREAM BY SOLID PARTICLE ADDITION IN VENTURI CONTACTOR

BACKGROUND OF THE INVENTION

The present invention relates to the removal of fine particles from a gas stream.

The development of advanced energy sources such as coal and shale oil gassification result in high temperature and pressure process gas streams which require removal of fine particles before utilization. For example, the ultimate use of such a process of gas could be combustion and expansion in a gas turbine for generation of electric power. Turbo-machine experience indicates that potential erosion and/or corrosion of machine components are due in part to fine particles in the gas stream.

The elevated temperature and pressure of such process streams suggests that new techniques for removal of fine particles may be necessary. Typical particle collectors used in fossil-fired power plants (electrostatic precipitators, scrubbers, fabric filters) generally operate at temperatures below 500° F. and at low pressures. Accordingly, the suitability of these components at elevated temperatures and pressures may be limited.

SUMMARY OF THE INVENTION

The present invention provides a process and system for removing fine particles from a gas stream, which may be employed under conditions of high temperature and pressure, although not being limited to such conditions.

According to the present invention fine particles contaminating a gas stream are removed from the gas stream by moving the gas stream at a velocity of between 50 and 500 feet per second; dispersing relatively larger solid collector particles into the gas stream to cause the collector particles to capture the fine particles by interception and inertial impaction and thereby form agglomerates consisting of the collector particles having the fine particles adhered thereto; and removing the agglomerates from the gas stream. Because of their relatively larger size the agglomerates can be removed from the gas stream by techniques that are relatively less difficult than those that are employed for the removal of fine particles.

The present invention is somewhat similar to wet scrubbing; but because the collector particles are solid, the present invention may be employed at higher temperatures and pressures than wet scrubbing techniques. The present invention nevertheless may be employed to remove fine particles that are either solid or liquid, and further may be employed at the same lower temperatures and pressures as the wet scrubbing techniques.

In one preferred embodiment the collector particles are dispersed into the gas stream containing the fine particles prior to this gas stream being accelerated to move at the required velocity, whereupon the subsequent movement of the gas stream at the higher velocity causes the fine particles entrained in the gas stream to move sufficiently faster than the larger collector particles to result in their capture by interception and inertial impaction. For high temperature applications it is preferred that the collector particles be dispersed by means of a pressurized second gas stream, as discussed above.

Alternatively, the collector particles may be dispersed into the gas stream by the force of gravity.

When it is desired to conserve the collector particles for recycling, the present invention further provides for cleaning the agglomerates to separate the fine particle material from the collector particles following removal of the agglomerates from the gas stream; and then redispersing the separated collector particles into the gas stream containing fine particles. Separating includes both detaching the fine particles from the collector particles and then moving them away from each other. Preferably the fine particles are moved away from the collector particles by elutriation.

Potential applications for the present invention include:

(a) fossil fueled power plant flue gas cleaning to remove fly ash and/or liquid (smoke) particles;

(b) chemical processes which emit gas streams containing particulate (liquid or solid) contaminants;

(c) petroleum refining processes, such as fluidized bed catalytic cracking;

(d) mineral (rock) processing operations, such as mining, quarrying, crushing and grinding, conveying, drying, calcining, roasting, and melting;

(e) metallurgical operations, such as blast furnaces, open hearths, basic oxygen furnaces, sintering plants, cupolas, electric furnaces, casting plants, and roasters;

(f) operations which emit gas streams containing entrained liquid; and (g) operations which emit gas streams which are too hot to be cleaned by devices such as wet scrubbers and fabric filters.

Some of the advantages of the present invention are that no liquid waste disposal is required as for wet scrubbers; no sludge disposal is required; and corrosion is less severe than for wet systems. The collector particles can be selected so as to give no gas absorption or adsorption. This can be an advantage in fly ash control for power plants if no sulfur dioxide removal is required. Also larger particle size can be controlled independently of collector particle and agglomerate flow parameters. Thereby one can control the collection efficiency and power requirement better than for wet scrubbers and achieve more economical operation. In addition, fine particle collection efficiency can equal or exceed the capability of high energy wet scrubbers (such as venturi scrubbers).

DESCRIPTION OF THE PREFERRED EMBODIMENT

Figure 1:
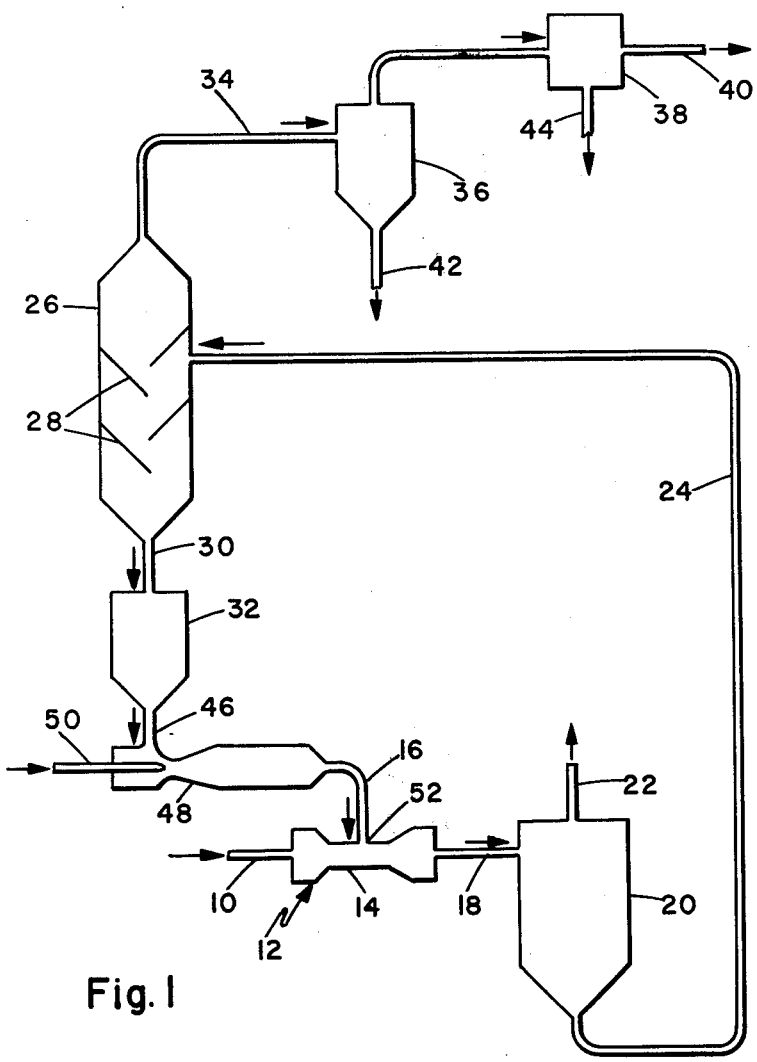
FIG. 1 is a schematic flow diagram showing the process and system of the present invention.

Referring to FIG. 1, the system of the present invention includes a gas line 10 for carrying a gas stream contaminated by fine particles entrained therein. The line 10 carries the gas stream into a venturi 12. The gas stream is accelerated by venturi 12 to move at a desired velocity within the throat 14 of the venturi 12. The gas stream velocity in the throat 14 may vary from about 50 to 500 ft/sec, depending on the efficiency requirements and the fine particle characteristics. About 100 to 300 ft/sec is preferred.

A line 16 conveys collector particles which are dispersed into the gas stream within the throat 14 of the venturi 12. That portion of the system in which the collector particles capture the fine particles is referred to as the "contactor". An orifice defining the throat of the contactor may be substituted for the venturi 12.

The number and size of collector particle dispersing lines 16 will depend on the size and configuration of the contactor. The contactor may be circular or rectangular in cross-section. Collector particle dispersal can alternatively be into the converging section rather than the throat of the venturi 12.

The venturi throat length from the end of the converging section to the beginning of the diverging section may vary from about 1 to 5 times the throat width; 2 to 3 times being preferred. The included angle of the diverging section (diffuser) of the venturi 12 can vary over a wide range. An abrupt expansion from the throat to a larger diameter (or width) may be used instead of a diffuser. If an abrupt expansion is used it is possible to do away with the throat section and to inject the collector particles into the gas jet issuing from the converging section.

When fine particles come into contact with the collector particles, they adhere (to varying degrees) to the collector particles to form agglomerates. The mixture of gas and agglomerates flows from the contactor through a line 18 into an agglomerate separator 20. A cyclone-type separator is shown in FIG. 1 but other types of separators might be used. The efficiency requirements for the separator 20 depend upon the nature of the fine particles and the type of collector particles being used.

If the fine particles are smaller than 3 micrometers aerodynamic diameter and the collector particles are at least 10 times larger, a low efficiency separator 20 can be used. If the contaminant particle size distribution includes an appreciable fraction of particles up to perhaps 20 micrometers aerodynamic diameter, the separator 20 may have to be somewhat more efficient; i.e., of medium efficiency.

The cleaned gas flows from the cyclone separator 20 via line 22 to be used as desired. An underflow stream containing the agglomerates, collector particles, and a small quantity of gas flows from the separator 20 via a line 24 to a collector cleaner 26.

Referring again to FIG. 1, the collector cleaner 26 detaches solid fine particles from the agglomerates and causes the fine particles to flow in a different stream from the collector particles. The cleaner 26 shown in FIG. 1 causes the collectors and agglomerates to cascade downward over a series of impact baffles 28. The forces due to the impact of agglomerates on the baffles 28 causes fine particles to be detached from the collector particles. An upward flow of gas causes the fine particles to be eluted upward while the larger collector particles can fall downward through a line 30 into a hopper 32.

Other types of collector cleaners may be used for detaching solid fine particles such as (i) agitation of a mass of agglomerates in a fluidized bed; (ii) agitation of a mass of agglomerates by mechanical stirring; (iii) agitation of a mass of agglomerates by tumbling in a rotary kiln-type device, which may be fitted with chain and similar devices to agitate and impact the agglomerates; or (iv) agitation and impaction in a rod mill or ball mill.

When the fine particles are liquid a different cleaning method is necessary unless the agglomerates (wetted collectors) are to be discarded. Liquid fine particle material may be separated from the collectors by washing, centrifugation, evaporation, or other methods appropriate to the fine particle and collector particle properties.

Solid fine particles, once detached, can be separated from the mixture by elutriation with a gas or by use of a separating force made possible by differences between collector particle and fine particle properties other than aerodynamic size. For example, differences in magnetic or dielectric properties can be utilized for separation of the two material once the fine particles are detached from the agglomerates.

If elutriating gas is used it may be necessary to remove the fine particles from the elutriating gas before it is vented or recycled. Because the flow rate of the elutriating gas is a very small percentage of the dirty gas stream rate, it can be cleaned at less expense than the dirty gas stream.

A line 34 is provided in the system of FIG. 1 for removing the solid fine particles suspended in the elution gas from the cleaner 26. The fine particles are separated from the elution gas by a medium efficiency cyclone separator 36 followed by a filter 38. Alternatively the elution gas in line 34 can be cleaned by the filter 38 alone or in some other device capable of high enough collection efficiency to suit the purity requirements for the clean gas stream provided in line 40.

Alternatively the gas stream in line 40 can be recycled by passing the stream from line 40 through a fan (not shown) and introducing it into the cleaner 26. Removed fine particles flow from the system for disposal through lines 42 and 44.

Collector particles flow from the cleaner 26 through the line 30 into the storage hopper 32. The collector particles are dispersed from the hopper 32 through line 46 into a gas jet ejector pump 48. A pressurized second gas stream flows from a line 50 into the ejector pump 48 and causes the flow of collector particles into the venturi 12 through the line 16 and injection nozzles 52. This technique of dispersing the collector particles is preferred when the gas stream containing the fine particles flowing through line 10 is at high temperature and when the collector particles also must be at a high temperature. The ejector pump 48 serves both to convey the collector particles and to raise the pressure of the second gas stream sufficiently for the collector particles to enter the venturi 12. The gas pressure at the injection points 52 into the venturi 12 is higher than in the gas stream in line 18 following the throat 14 and further downstream due to the energy expended in accelerating the collector particles to near the velocity of the gas stream containing the fine particles in the throat 14.

Figure 2:
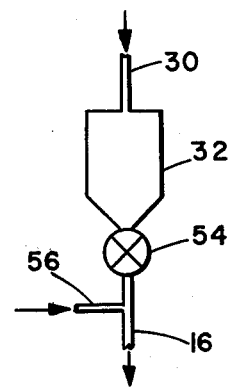
FIG. 2 is a schematic flow diagram showing an alternative embodiment of a portion of the collector particle dispersal means of the system to that shown in FIG. 1.
Figure 3:
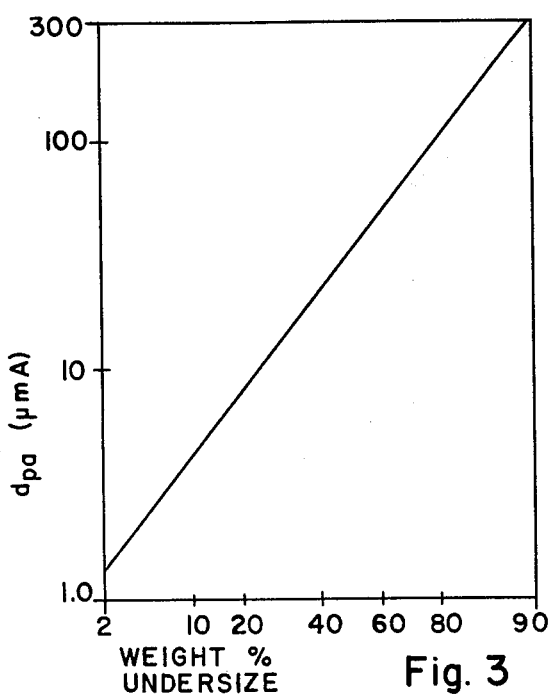
FIGS. 3 through 7 are graphs showing the relationship between various parameters affecting the collection efficiency of the fine particle removal process of the present invention.
Figure 4:
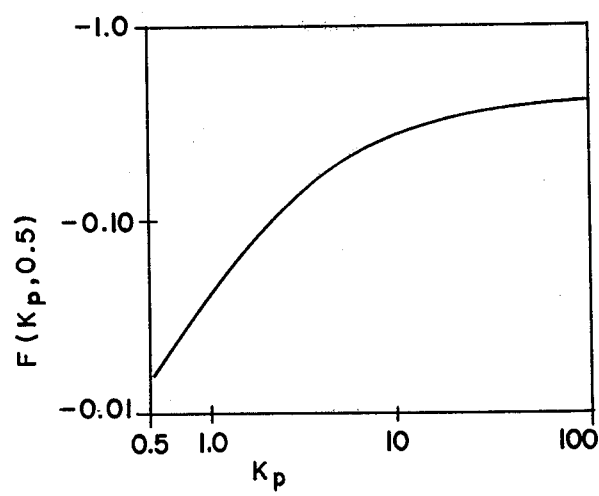

In an alternative embodiment, shown in part in FIG. 2, wherein high temperature conditions would not inhibit the operation of a rotary valve, the collector particles are taken from the hopper 32 through a rotary valve 54 and then through line 16. Line 16 is connected to the collector particle injection nozzles 52 and is sized appropriately so that collector particles will flow freely into the throat 14. Conveying gas may be introduced into line 16 through line 56 to aid the movement of collector particles into the throat 14.

Alternatively, the collector particles can be dispersed into the throat 14 by the force of gravity.

In another alternative embodiment (not shown) the collector particles are dispersed into the gas stream containing fine particles prior to such gas stream being accelerated to move at the required velocity. In such an embodiment the collector particles can be dispersed by means of the gas jet ejector pump 48, discussed hereinabove; or the collector particles can be dispersed into the gas stream by the force of gravity.

Figure 7:
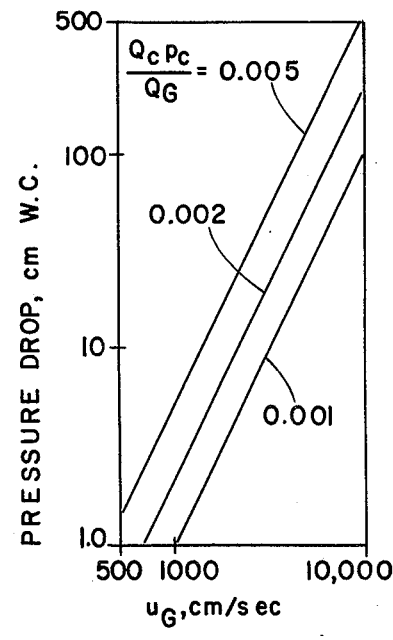

The system shown in FIG. 1 provides for recycling the collector particles. It also can be used without collector particle recycling such as when the fine particles sinter or otherwise strongly adhere to the collector particles; in which event the agglomerates would flow from the separator 20 through a conventional hopper and gas lock system into the line 6 for disposal.

For a fine particle removal system according to the present invention which uses a venturi device for the contactor, estimates of the collection efficiency may be made. Calculations are based upon the inertial inpaction collection mechanism, assuming that every fine particle which contacts a collector particle is captured. The particle penetration (1-collection efficiency), for a given size particle is given by the following expression:

$$Pt = \exp\left[\left(\frac{2Q_c\, u_G\, \rho_c\, d_c}{55\, Q_G\, \mu}\right) \times 10^{-4}\, F(K_{pt}, f)\right] \quad (1)$$

where $d_c$=collector particle diameter, $\mu$m;

$\rho_c$=collector particle density, g/c m$^3$;

$u_G$=gas velocity, cm/sec;

$\mu$=gas viscosity, g/cm-sec;

$Q_c$=volumetric flow rate of collector particles, cm$^3$/sec; and $Q_G$=volumetric flow rate of gas containing fine particles, cm$^3$/sec.

$F(K_{pt}, f)$ is a function of the impaction parameter ($K_{pt}$) and an experimentally determined constant, f. The impaction parameter is defined here as:

$$K_{pt} = (u_G\, d_{pa}^2 / 9\mu d_c) \times 10^{-4} \quad (2)$$

where $d_{pa}$ is the fine particle aerodynamic diameter, which is defined by the geometric diameter times the square root of the product of the particle density and the Cunningham correction factor.

The system of the present invention can be applied to a power plant in the following manner. Consider a 350 megawatt coal-burning power plant with the following flue gas characteristics:

| | |
|---|---|
| Flow rate | 5.4 × 10$^5$ ACFM |
| Temperature | 325° F. |
| Fine particle loading | 1.7 gr/SCF |

The initial particle size distribution is shown in FIG. 3. FIG. 3 shows a long normal distribution with a mean diameter of 38 $\mu$mA and a standard deviation of approximately 5.

FIG. 4 shows the value of the function $F(K_{pt}, f)$ versus $K_{pt}$ which was constructed using f=0.5, which is a typical value for venturi contactors.

In order to achieve a removal efficiency of 99% of the initial fine particle loading, various combinations of the controlling parameters are possible. For a given collector particle size, the gas velocity or the collector mass flow ratio ($Q_c\rho_c/Q_G$) can be set and the remaining parameter varied to achieve the required collection efficiency.

FIG. 5 shows the penetration as a function of fine particle size for 50 $\mu$m collector particles and a collector particle to gas ratio of 0.005. Curves for various gas velocities are shown. Total penetration of 1% can be achieved with a flow rate of about 3,250 cm/sec (107 ft/sec). The predicted pressure drop for this embodiment would be 52.8 cm W.C. (21 inches W.C.) assuming that the collector particle density is 125 lb/ft$^3$. The required collector particle mass flow rate is approximately 75 ton/min. Using the same collector particles the collector recycle rate can be reduced; however, a higher gas velocity is needed thereby resulting in a larger pressure drop.

FIG. 6 is a similar penetration plot for 100 $\mu$m diameter collector particles. Comparison with FIG. 5 shows that 99% removal could occur with a gas velocity of about 4,750 cm/sec (156 ft/sec), the predicted pressure drop for this case is 46.5 cm W.C. (18.3 inches W.C.). For this embodiment the collector to gas ratio is only 0.002 resulting in a collector recycle stream of 30 ton/-min.

The penetration curves of FIGS. 5 and 6 are observed to have the following characteristics:

A. For a given set of operating conditions the penetration decreases with increasing size of the fine particles. This is expected since the collection mechanism is inertial impaction of the fine particles upon the collector particles.

B. For a given size of collector particle and aerodynamic diameter of fine particle, the penetration decreases with increasing value of ($Q_c\rho_c/Q_G$). This is apparent from inspection of equation (1).

C. A similar dependence upon the gas velocity is apparent from equation (1). However, the gas velocity also results in an increase in $K_{pt}$ which generally increases $F(K_{pt}, f)$ so that the decrease in penetration can be greater than a corresponding increase in ($Q_c\rho_c/Q_G$).

D. The dependence upon collector particle diameter is more complicated. It depends upon what size fine particle is being collected ($d_{pa}$) and the operating conditions.

The overall efficiency of collection is obtained by integrating the product of the penetration (for a given fine particle size) times the fine particle size frequency over the entire range of fine particle sizes.

$$\text{efficiency} = 1.0 - \int_0^\infty Pt \cdot f(d_{pa})\, d(d_{pa}) = 1.0 - \overline{Pt} \quad (3)$$

The pressure drop for a venturi contactor may be estimated by using the following equation:

$$\Delta p(\text{cm W.C.}) = 1.0 \times 10^{-3} (Q_c\rho_c/Q_G) u_G^2 \quad (4)$$

(W.C. means water column.)

FIG. 7 shows the pressure drop in the contactor as a function of gas velocity for various values of ($Q_c\rho_c/Q_G$). The predicted pressure drop for the previous calculations could be obtained with the aid of FIG. 7 or equation (4).

The removal efficiency for a given set of operating conditions (gas flow rate, collector particle size, and collector particle flow rate) depends upon the initial fine particle size distribution existing in the gas. For a given size distribution the optimum choice of gas velocity, collector, particle size, and collector flow rate can be obtained to minimize the pressure drop.

Figure 5:
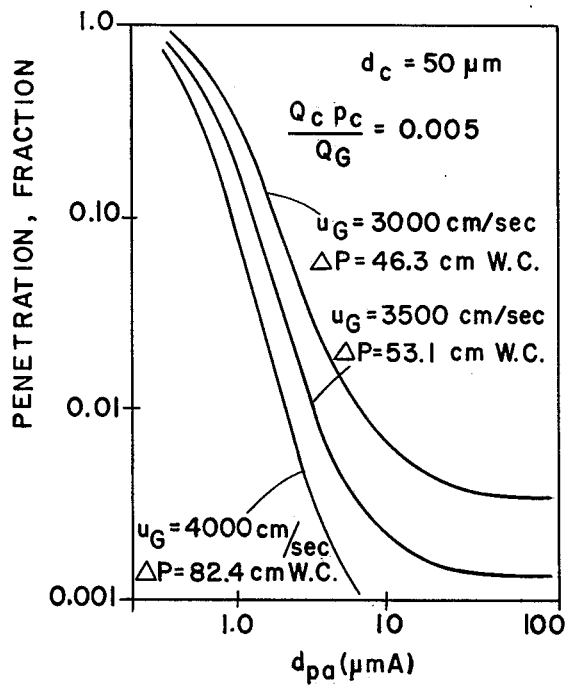
Figure 6:
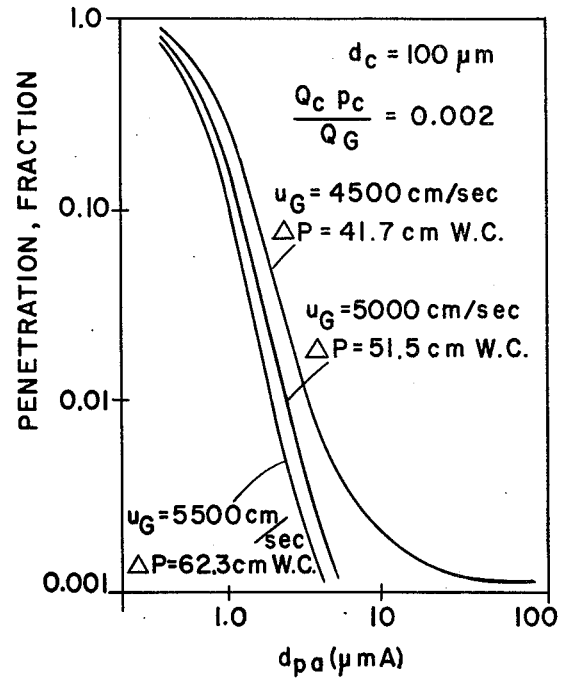

The collection efficiency for a venturi contactor as calculated from equation (1) and shown in FIGS. 5 and 6 does not depend directly on temperature or pressure. This develops because the collection mechanism is inertial impaction, which depends upon fine particle momentum. For given fine particle and collector particle sizes, the penetration is dependent upon the gas velocity, volumetric flow of both the gas and collector particles, gas viscosity and the impaction parameter. The impaction parameter is then dependent upon the gas velocity and viscosity. The viscosity of most gases is a slowly increasing function of temperature. Increased viscosity therefore reduces the penetration as shown by equation (1). However, the previous calculations show that high total efficiency can be obtained by appropriate choice of gas velocity and collector flow rate.

The choice of appropriate collector particles depends upon the thermal and chemical environment. Collector particle properties which must be considered include particle density, melting point, abrasion resistance, cost, hardness and strength. Preferred collector particles include large ash particles, large agglomerates of the fine particles, sand and metal beads.

Figure 8:
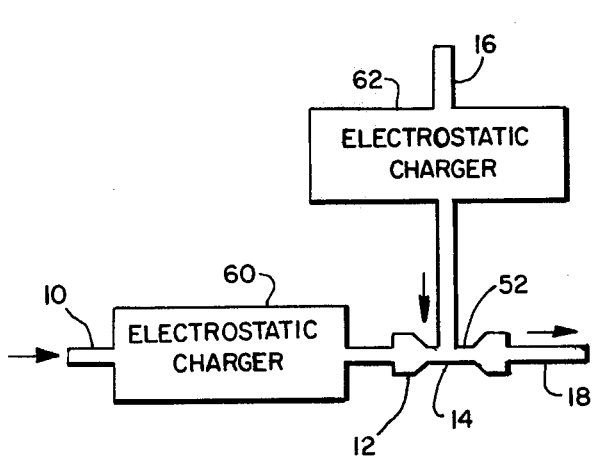
FIG. 8 is a schematic flow diagram showing an alternative embodiment of a portion of the process and system shown in FIG. 1.

Increased collection efficiency can be obtained by electrostatically charging fine particles and collector particles to opposite polarities with electrostatic chargers 60 and 62, respectively (FIG. 8). This increases the capture efficiency by introducing an additional mechanism for particle collection. The results show that this technique is most effective for small particles (less than 1 $\mu$m dia.). Alternatively, only either the fine particles or the collector particles may be electrostatically charged.

Having described my invention, I now claim:

1. A process for removing finely divided solid particulate matter at high efficiency from a gas stream by interception and inertial impaction, comprising:
   (a) moving a gas stream containing finely divided solid or liquid particulate matter at a velocity of between 100 and 300 feet per second in a given direction through a tubular venturi contactor;
   (b) dispersing relatively larger solid collector particles into said gas stream at a negligible velocity in said given direction as said gas stream flows through said tubular venturi contactor, said collector particles being sufficiently large so as to cause said collector particles to capture said particulate matter by interception and inertial impaction and thereby form agglomerates consisting of said collector particles having said particulate matter adhered thereto, the amount of collector particles being dispersed selected such that the ratio of the flow rate of the collector particles to the flow rate of the gas is at least (0.001 gm/sec)/(cm³/sec);
   (c) maintaining the pressure drop across said tubular contactor to at least 9.3 cm water column;
   wherein said velocity of the gas stream, size of the collector particles, and ratio of flow rate of collector particles to flow rate of gas is further selected from the limitations set forth in (a), (b) and (c) above such that approximately 99% of the particulate matter in the gas stream is captured by said collector particles; and
   (d) removing said agglomerates from said gas stream.

2. A process according to claim 1, wherein said dispersing step comprises
   dispersing said collector particles into a pressurized second gas stream; and
   pumping said pressurized second gas stream into said gas stream containing fine particles.

3. A process according to claim 1, wherein said collector particles are dispersed into said gas stream by the force of gravity.

4. A process according to claim 1, further comprising
   cleaning said agglomerates to separate said fine particle material from said collector particles following removal of said agglomerates from said gas stream; and
   redispersing said separated collector particles into said gas stream containing fine particles.

5. A process according to claim 4, wherein the cleaning step comprises detaching said fine particles from said collector particles; and elutriating said detached fine particles away from said collector particles.

6. A process according to claim 1, further comprising;
   electrostatically charging said fine particles and said collector particles to opposite polarities to provide an electrostatic attraction between said fine particles and said collector particles.

7. A process according to claim 1, further comprising;
   electrostatically charging said fine particles to provide an electrostatic attraction between said fine particles and said collector particles.

8. A process according to claim 1, further comprising;
   electrostatically charging said collector particles to provide an electrostatic attraction between said fine particles and said collector particles.

9. A process according to claim 1 wherein the aerodynamic diameter of said collector particles is at least ten times larger than that of said finely divided particulate matter.

10. A process according to claim 1 wherein the ratio of the flow rate of the collector particles to the flow rate of the gas is at least (0.002 gm/sec)/(cm³/sec).

11. A process according to claim 1 wherein the median diameter of the finely divided particulate matter is 38 $\mu$mA with a geometric standard deviation of approximately 5.

12. A process for removing finely divided solid particulate matter at high efficiency from a gas stream by interception and inertial impaction, comprising:
   (a) dispersing relatively larger solid collector particles into said gas stream as said gas stream flows through a tubular venturi contactor containing finely divided solid particulate matter;
   (b) moving said gas stream having said collector particles dispersed therein at a velocity of between 100 and 300 feet per second through said tubular venturi contactor, said collector particles being sufficiently large so as to cause said collector particles to capture said particulate matter by interception and inertial impaction and thereby form agglomerates consisting of said collector particles having said particulate matter adhered thereto, the amount of collector particles being dispersed selected such that the ratio of the flow rate of the collector particles to the flow rate of the gas is at least (0.001 gm/sec)/(cm$^3$/sec);

(c) maintaining the pressure drop across said tubular contactor to at least 9.3 cm water column;

wherein said velocity of the gas stream, size of the collector particles, and ratio of flow rate of collector particles to flow rate of gas is further selected from the limitations set forth in (a), (b) and (c) above such that approximately 99% of the particulate matter in the gas stream is captured by said collector particles; and (d) removing said agglomerates from said gas stream.

13. A process according to claim 11, wherein the cleaning step comprises detaching said fine particles from said collector particles; and elutriating said detached fine particles away from said collector particles.

14. A process according to claim 12, further comprising;

electrostatically charging said fine particles and said collector particles to opposite polarities to provide an electrostatic attraction between said fine particles and said collector particles.

15. A process according to claim 12, further comprising;

electrostatically charging said fine particles to provide an electrostatic attraction between said fine particles and said collector particles.

16. A process according to claim 12, further comprising;

electrostatically charging said collector particles to provide an electrostatic attraction between said fine particles and said collector particles.

17. A process according to claim 12 wherein the ratio of the flow rate of the collector particles to the flow rate of the gas is at least (0.002 gm/sec)/cm$^3$/sec).

18. A process according to claim 7, further comprising cleaning said agglomerates to separate said fine particle material from said collector particles following removal of said agglomerates from said gas stream; and redispersing said separated collector particles into said gas stream.

19. A process according to claim 7, wherein said dispersing step comprises dispersing said collector particles into a second pressurized gas stream; and pumping said pressurized second gas stream into said gas stream containing fine particles.

20. A process according to claim 7, wherein said collector particles are dispersed into said gas stream prior to said gas stream being moved at said velocity.

21. A process according to claim 9, wherein the dispersing step includes dispersing said collector particles into said gas stream by the force of gravity.

* * * * *